(12) United States Patent
Murooka et al.

(10) Patent No.: US 8,040,585 B2
(45) Date of Patent: Oct. 18, 2011

(54) OPTICAL DEVICE AND OPTICAL SYSTEM

(75) Inventors: Takashi Murooka, Ashigarakami-gun (JP); Hideyasu Ishibashi, Ashigarakami-gun (JP); Ichiro Amimori, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 331 days.

(21) Appl. No.: 12/350,575

(22) Filed: Jan. 8, 2009

(65) Prior Publication Data
US 2009/0190200 A1    Jul. 30, 2009

(30) Foreign Application Priority Data
Jan. 9, 2008  (JP) ................................ 2008-002594

(51) Int. Cl.
G02F 1/23 (2006.01)
G02F 1/03 (2006.01)
G02B 26/08 (2006.01)

(52) U.S. Cl. .................. 359/278; 359/245; 359/300

(58) Field of Classification Search .......... 359/278–279, 359/238–239, 245, 298, 300–304
See application file for complete search history.

(56) References Cited

U.S. PATENT DOCUMENTS
6,452,646 B1 * 9/2002 Sharp et al. ................ 349/18
6,760,475 B1 * 7/2004 Miller ......................... 382/162

FOREIGN PATENT DOCUMENTS
JP            2971945 B2    8/1999
JP         2000-267127 A    9/2000
* cited by examiner

*Primary Examiner* — Ricky Mack
*Assistant Examiner* — Dawayne Pinkney
(74) *Attorney, Agent, or Firm* — Sughrue Mion, PLLC

(57) ABSTRACT

There is provided an optical device including a plurality of polarizers that are arranged along a propagation direction of incident light, where the plurality of polarizers have transmission axes of substantially the same direction, a phaser that is provided between the plurality of polarizers, where the phaser has a retarded-phase axis forming a predetermined angle with the transmission axes of the plurality of polarizers, and a phase modulator that is provided adjacent to the phaser along the propagation direction, where the phase modulator has a retarded-phase axis of substantially the same direction as the retarded-phase axis of the phaser. Here, a phase difference generated in the incident light by the phase modulator is temporally adjusted such that the optical device transmits light in different wavelength ranges at different timings.

9 Claims, 5 Drawing Sheets

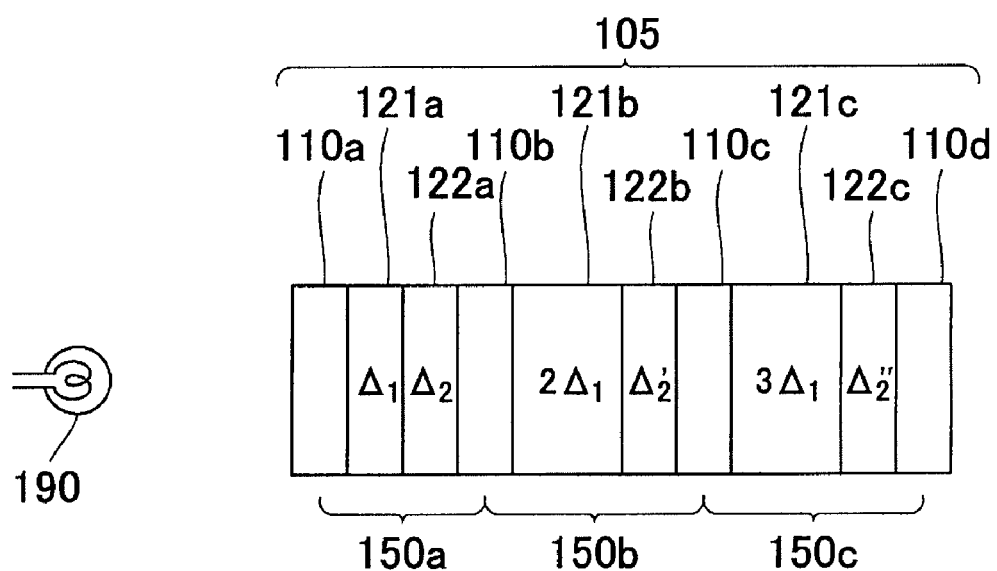
F I G . 1

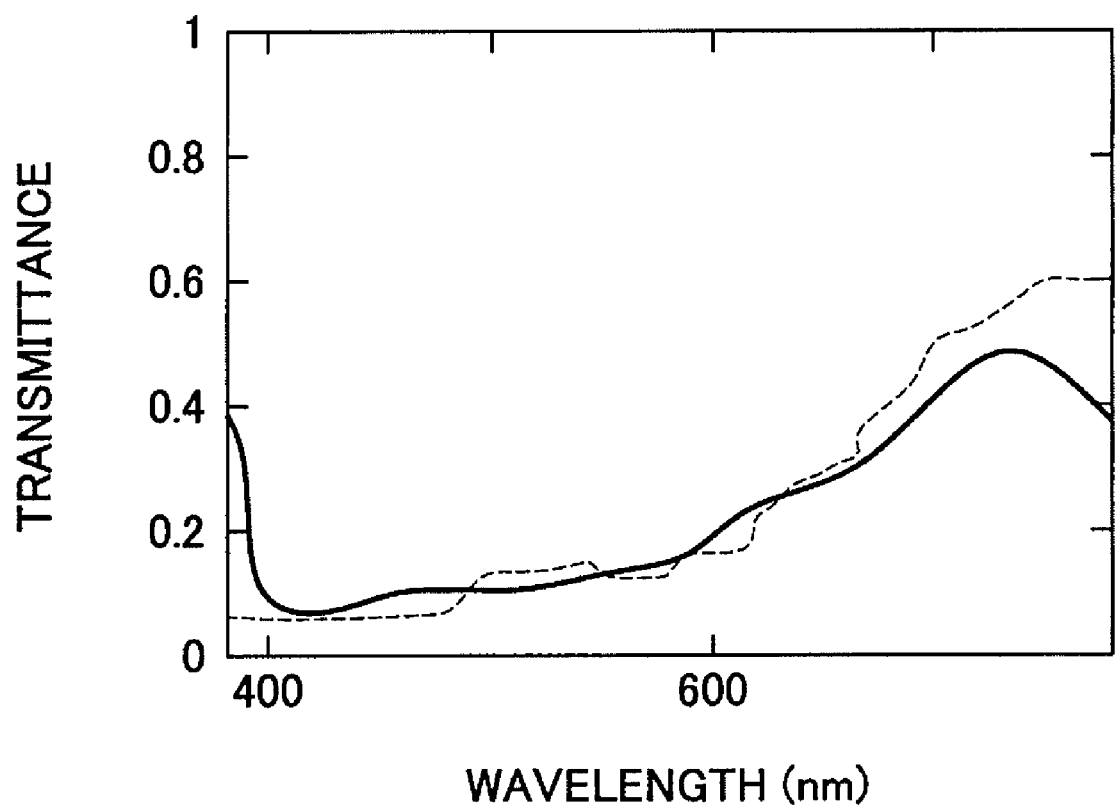
F I G . 3

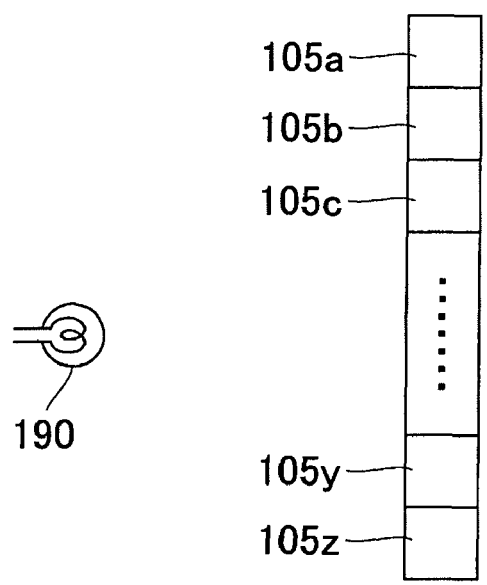
F I G. 4A
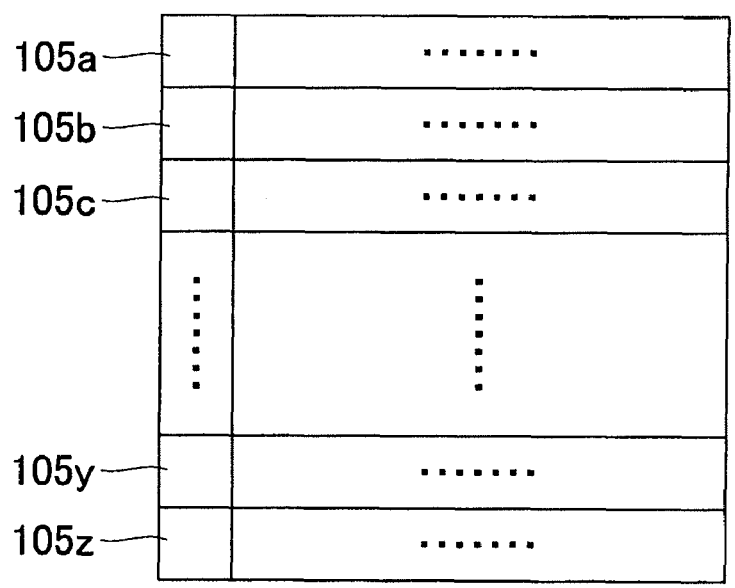
F I G. 4B

OPTICAL DEVICE AND OPTICAL SYSTEM

CROSS REFERENCE TO RELATED APPLICATION

This patent application claims priority from a Japanese patent application No. 2008-002594 filed on Jan. 9, 2008, the contents of which are incorporated herein by reference.

BACKGROUND

1. Technical Field

The present invention relates to an optical device and an optical system. More particularly, the present invention relates to an optical device for transmitting light and to an optical system using the optical device.

2. Related Art

A known adjustable optical filter uses a ferroelectric liquid crystal material for forming an adjusting element, for example, as disclosed in Japanese Patent No. 2971945. Furthermore, a known wavelength variable color filter uses liquid crystal, for example, as disclosed in Japanese Patent Application Publication No. 2000-267127.

The techniques disclosed in the above-identified patent literature, however, block light in a wavelength range except for a specified wavelength range. For this reason, the above techniques cannot emit light having a desired spectrum such as a substantially smoothly distributed spectrum.

SUMMARY

Therefore, it is an object of an aspect of the innovations herein to provide an optical device and an optical system which are capable of overcoming the above drawbacks accompanying the related art. The above and other objects can be achieved by combinations described in the independent claims. The dependent claims define further advantageous and exemplary combinations of the innovations herein.

According to the first aspect related to the innovations herein, one exemplary optical device may include a plurality of polarizers that are arranged along a propagation direction of incident light, where the plurality of polarizers having transmission axes of substantially the same direction, a phaser that is provided between the plurality of polarizers, where the phaser has a retarded-phase axis forming a predetermined angle with the transmission axes of the plurality of polarizers, and a phase modulator that is provided adjacent to the phaser along the propagation direction, where the phase modulator has a retarded-phase axis of substantially the same direction as the retarded-phase axis of the phaser. Here, a phase difference generated in the incident light by the phase modulator is temporally adjusted such that the optical device transmits light in different wavelength ranges at different timings.

According to the second aspect related to the innovations herein, one exemplary optical system may include an optical device, an image obtaining section that obtains an image of a subject, a detecting section that detects an object showing the subject in the obtained image, a spectrum information storing section that stores therein, in association with the object, a spectrum of light from the subject shown by the object, and a control section that controls a spectral transmittance of the optical device according to the spectrum stored in the spectrum information storing section in association with the object detected by the detecting section. Here, the optical device includes a plurality of polarizers that are arranged along a propagation direction of incident light, where the plurality of polarizers have transmission axes of substantially the same direction, a phaser that is provided between the plurality of polarizers, where the phaser has a retarded-phase axis forming a predetermined angle with the transmission axes of the plurality of polarizers, and a phase modulator that is provided adjacent to the phaser along the propagation direction, where the phase modulator has a retarded-phase axis of substantially the same direction as the retarded-phase axis of the phaser. Here, the control section temporally adjusts a phase difference generated in the incident light by the phase modulator such that the optical device transmits light in different wavelength ranges at different timings, according to the spectrum stored in the spectrum information storing section in association with the object detected by the detecting section.

According to the third aspect related to the innovations herein, one exemplary optical device may include a plurality of optical elements arranged on a plane. Here, each of the plurality of optical elements includes a plurality of polarizers that are arranged along a propagation direction of incident light, where the plurality of polarizers have transmission axes of substantially the same direction, a phaser that is provided between the plurality of polarizers, where the phaser has a retarded-phase axis forming a predetermined angle with the transmission axes of the plurality of polarizers, and a phase modulator that is provided adjacent to the phaser along the propagation direction, where the phase modulator has a retarded-phase axis of substantially the same direction as the retarded-phase axis of the phaser. Here, phase differences generated in the incident light respectively by the phase modulators in the plurality of optical elements are adjusted such that optical elements positioned in the vicinity of each other emit light rays having partial spectra that together form a predetermined spectrum.

According to the fourth aspect related to the innovations herein, one exemplary optical system may include an optical device, an image obtaining section that obtains an image of a subject, a detecting section that detects an object showing the subject in the obtained image, a spectrum information storing section that stores therein, in association with the object, a spectrum of light from the subject shown by the object, and a control section that controls a spectral transmittance of the optical device according to the spectrum stored in the spectrum information storing section in association with the object detected by the detecting section. Here, the optical device includes a plurality of optical elements arranged on a plane, and each of the plurality of optical elements includes a plurality of polarizers that are arranged along a propagation direction of incident light, where the plurality of polarizers have transmission axes of substantially the same direction, a phaser that is provided between the plurality of polarizers, where the phaser has a retarded-phase axis forming a predetermined angle with the transmission axes of the plurality of polarizers, and a phase modulator that is provided adjacent to the phaser along the propagation direction, where the phase modulator has a retarded-phase axis of substantially the same direction as the retarded-phase axis of the phaser. Here, the control section adjusts phase differences generated in the incident light by phase modulators in optical elements positioned in the vicinity of each other such that the optical elements positioned in the vicinity of each other respectively emit light rays having partial spectra that together form a spectrum substantially the same as the spectrum stored on the spectrum information storing section in association with the object detected by the detecting section.

The summary clause does not necessarily describe all necessary features of the embodiments of the present invention.

The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 1 illustrates an example of an optical device 100 relating to an embodiment of the present invention.

FIG. 3 illustrates an exemplary spectral transmittance of an optical element 105.

FIGS. 4A and 4B together illustrate an example of the optical device 100 having a plurality of optical elements 105.

DESCRIPTION OF EXEMPLARY EMBODIMENTS

Figure 2:
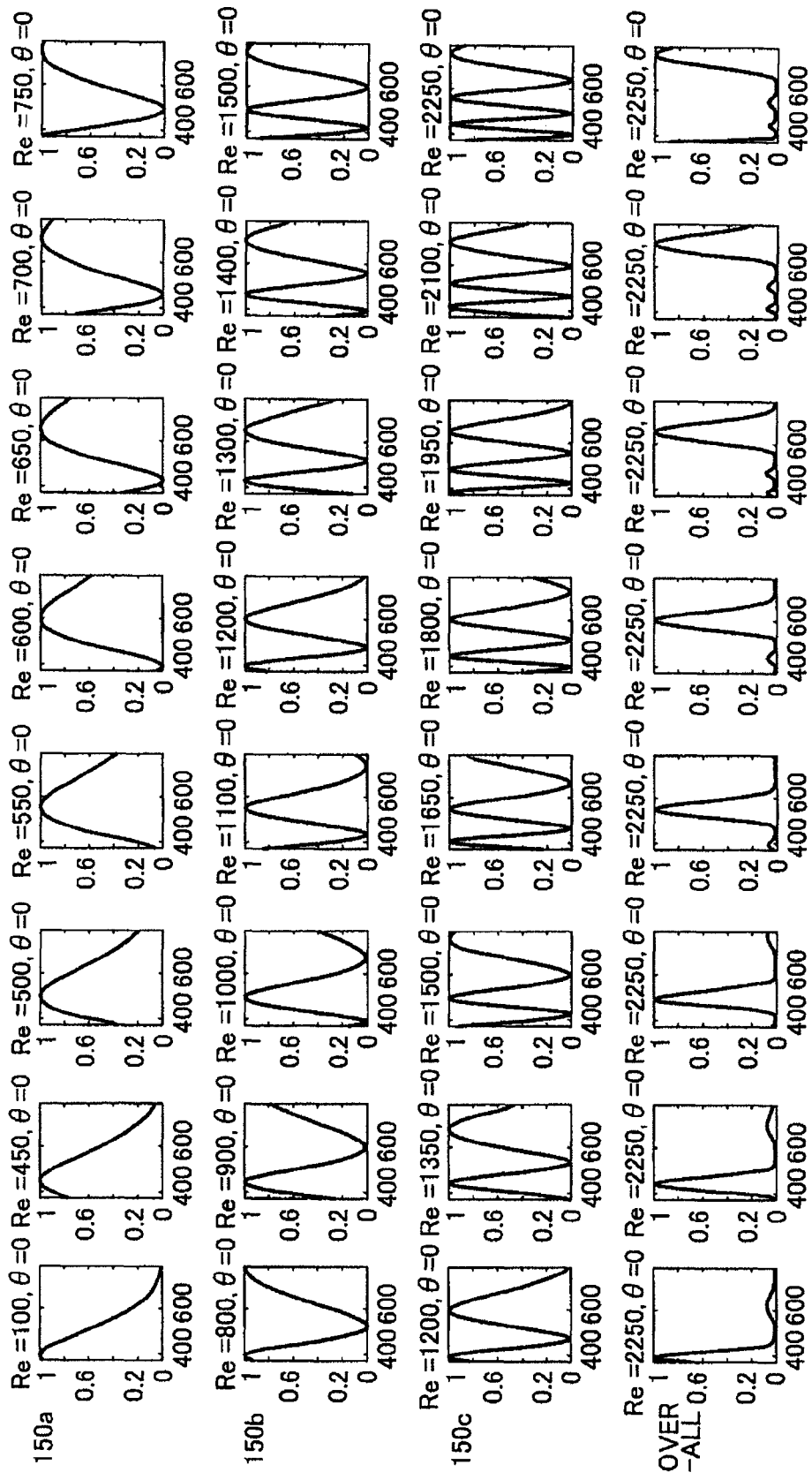
FIG. 2 illustrates exemplary spectral transmittances of optical units 150.

Some aspects of the invention will now be described based on the embodiments, which do not intend to limit the scope of the present invention, but exemplify the invention. All of the features and the combinations thereof described in the embodiment are not necessarily essential to the invention.

FIG. 1 illustrates an example of an optical device 100 relating to an embodiment of the present invention. The optical device 100 relating to the present embodiment is designed to generate light having a substantially desired spectrum. The optical device 100 includes an optical element 105 and a light source 190. The optical element 105 includes a plurality of polarizers 110a to 110d (hereinafter collectively referred to as the polarizers 110), a plurality of phasers 121a to 121c (hereinafter collectively referred to as the phasers 121), and a plurality of phase modulators 122a to 122c (hereinafter collectively referred to as the phase modulators 122). The optical element 105 may function as the optical device in some embodiments.

The light source 190 emits light, which is incident on the optical element 105. For example, the light source 190 emits white light. The polarizers 110 are arranged along the propagation direction of the incident light. Specifically speaking, the polarizers 110 are arranged along the direction in which the light from the light source 190 is propagated. Note that the polarizers 110 may have transmission axes extending in substantially the same direction. The light source 190 emits light part of which is polarized in the direction of the transmission axis of the polarizer 110a. For example, the light source 190 may emit unpolarized light. The light source 190 may emit light polarized in the direction of the transmission axis of the polarizer 110a.

Each of the phasers 121 is provided between any two of the polarizers 110. The phasers 121 are arranged along the propagation direction of the incident light. The phasers 121 have retarded-phase axes forming a predetermined angle with the transmission axes of the polarizers 110 arranged along the propagation direction of the incident light. For example, the phasers 121a and 121b may have retarded-phase axes forming an angle of 45 degrees with respect to the transmission axes of the polarizers 110. When the retardation of the phaser 121a is expressed as $\Delta_1$, the retardation of the phaser 121b is given as $2\Delta_1$ and the retardation of the phaser 121c is given as $3\Delta_1$. In other words, the phasers 121 are configured to generate phase differences in the incident light that increase substantially arithmetically or geometrically in the arrangement order of the phasers along the propagation.

Each of the phase modulators 122 is provided between one of the polarizers 110 and one of the phasers 121 arranged along the propagation direction of the incident light. Each phase modulator 122 is provided adjacent to one of the phasers 121 in the propagation direction. For example, the phase modulators 122 have retarded-phase axes of substantially the same direction as the retarded-phase axes of the phasers 121. The retardations of the phase modulators 122a, 122b and 122c are respectively represented as $\Delta_2$, $\Delta'_2$ and $\Delta''_2$.

As described above, the polarizers 110, the phasers 121 and the phase modulators 122 are arranged along the propagation direction of the incident light. The phase differences (for example, $\Delta_2$, $\Delta'_2$ and $\Delta''_2$) generated in the incident light by the phase modulators 122 may be adjusted such that light in a predetermined wavelength range out of the incident light is transmitted. For example, the phase modulators 122 may be formed by using a half-wave plate. The phasers 121 have retarded-phase axes forming an angle of 45 degrees with the transmission axes of the polarizers 110.

As seen from the above description, three or more polarizers 110 are arranged in the propagation direction of the incident light. Each phaser 121 is provided between any two of the three or more polarizers 110, and each phase modulator 122 is provided adjacent to one of the phasers 121 in the propagation direction of the incident light. In this manner, each phase modulator 122 is provided between a phaser 121 and an immediately following polarizer 110 in the propagation direction of the incident light.

The phase differences generated in the incident light by the phase modulators 122 are adjusted such that the optical element 105 transmits light in a predetermined wavelength range out of the incident light. For example, the phase differences generated in the incident light by the phase modulators 122 are temporally adjusted such that the optical element 105 transmits light in a different wavelength range at a different timing. For example, the phase differences generated in the incident light by the phase modulators 122 are temporally adjusted such that light rays respectively having partial spectra forming a predetermined spectrum are emitted at different timings.

The phase differences realized by the phase modulators 122 may be adjusted according to how much of the light in a predetermined wavelength range out of the incident light is to be transmitted. The phase differences realized by the phase modulators 122 may be adjusted with a temporal resolution shorter than the temporal resolution that can be sensed by a human or measuring apparatus. For this purpose, the phase modulators 122 can be formed, for example, by OCB liquid crystal, which exhibits a high response speed of no more than 10 ms.

The polarizer 110a, the phaser 121a, the phase modulator 122a, and the polarizer 110b constitute an optical unit 150a. The polarizer 110b, the phaser 121b, the phase modulator 122b, and the polarizer 110c constitute an optical unit 150b. The polarizer 110c, the phaser 121c, the phase modulator 122c, and the polarizer 110d constitute an optical unit 150c. In the following section of the specification, the optical units 150a to 150c may be collectively referred to as the optical units 150. The overall spectral transmittance of the optical element 105 can be adjusted by temporally adjusting the individual phase differences generated in the incident light by the phase modulators 122 included in the individual optical units 150. In this manner, the spectral transmittance of the optical element 105 can be temporally adjusted.

FIG. 2 illustrates exemplary spectral transmittances of the optical units 150. Here, the Stokes parameters (S0, S1, S2, S3) of light emerging from one given optical unit 150 are represented by the following equation, where the Stokes parameters of light incident on the optical unit are assumed to be (1, 0, 0, 0). Here, note that the retardation of the phase modulator 122 is given as $\Delta_{liq}$.

$$\begin{bmatrix} S_0 \\ S_1 \\ S_2 \\ S_3 \end{bmatrix} = \frac{1}{2} \begin{bmatrix} 1 & 1 & 0 & 0 \\ 1 & 1 & 0 & 0 \\ 0 & 0 & 0 & 0 \\ 0 & 0 & 0 & 0 \end{bmatrix} \begin{bmatrix} 1 & 0 & 0 & 0 \\ 0 & \cos2\theta & -\sin2\theta & 0 \\ 0 & \sin2\theta & \cos2\theta & 0 \\ 0 & 0 & 0 & 1 \end{bmatrix} \cdot$$

$$\begin{bmatrix} 1 & 0 & 0 & 0 \\ 0 & 1 & 0 & 0 \\ 0 & 0 & \cos\Delta_{liq} & \sin\Delta_{liq} \\ 0 & 0 & -\sin\Delta_{liq} & \cos\Delta_{liq} \end{bmatrix} \begin{bmatrix} 1 & 0 & 0 & 0 \\ 0 & 1 & 0 & 0 \\ 0 & 0 & \cos\Delta & \sin\Delta \\ 0 & 0 & -\sin\Delta & \cos\Delta \end{bmatrix} \cdot$$

$$\begin{bmatrix} 1 & 0 & 0 & 0 \\ 0 & \cos2\theta & -\sin2\theta & 0 \\ 0 & \sin2\theta & \cos2\theta & 0 \\ 0 & 0 & 0 & 1 \end{bmatrix} \cdot \begin{bmatrix} 1 & 1 & 0 & 0 \\ 1 & 1 & 0 & 0 \\ 0 & 0 & 0 & 0 \\ 0 & 0 & 0 & 0 \end{bmatrix} \begin{bmatrix} 1 \\ 0 \\ 0 \\ 0 \end{bmatrix}$$

Expression 1

The spectral transmittances shown in the graphs of FIG. 2 are calculated based on the light intensity levels obtained by the above expression, when the retardations of the phasers 121a, 121b and 121c of the optical units 150 are respectively fixed at 400 nm, 800 nm and 1200 nm and $\Delta_{liq}$ is set at 0 nm, 50 nm, 100 nm, 150 nm, 200 nm, 250 nm, 300 nm, and 350 nm. Here, the reference wavelength is set at 550 nm.

Above each graph showing a spectral transmittance, Re represents the total of the retardation values of the phaser 121 and the phase modulator 122. For example, the graphs on the top row show the spectral transmittances of the optical unit 150a (the phaser 121a: $\Delta_1$=400 nm), and respectively correspond to the $\Delta_{liq}$ values of 0 nm, 50 nm, 100 nm, 150 nm, 200 nm, 250 nm, 300 nm, and 350 nm, from the left. The same correspondence applies to the graphs on the second row showing the spectral transmittances of the optical unit 150b (the phaser 121b: $2\Delta_1$=800 nm) and to the graphs on the third row showing the spectral transmittances of the optical unit 150c (the phaser 121c: $3\Delta_1$=1200 nm). The graphs on the last row show the overall spectral transmittances collectively achieved by the optical units 150a, 150b and 150c, i.e., the spectral transmittances of the optical element 105.

FIG. 3 illustrates an exemplary effective spectral transmittance of the optical element 105. In FIG. 3, the solid line indicates an effective spectral transmittance of the optical element 105 achieved by controlling the respective time durations during which the spectral transmittance of the optical element 105 is maintained at the respective spectral transmittances shown by the eight graphs on the last row of FIG. 2. Specifically speaking, the solid line in FIG. 3 indicates a spectral transmittance obtained by combining the spectral transmittances of the optical element 105 when the retardation $\Delta_{liq}$ of the phase modulators 122 of the optical element 105 is set at 0 nm, 50 nm, 100 nm, 150 nm, 200 nm, 250 nm, 300 nm, and 350 nm with these respective retardation $\Delta_{liq}$ values being maintained for temporal durations of 4 msec, 3.2 msec, 6.4 msec, 4 msec, 6.4 msec, 16 msec, 8 msec, and 32 msec.

Note that the dotted line in FIG. 3 represents the spectral intensity of light from an animal skin, in the scale of spectral transmittance. As seen from FIG. 3, the dotted line and the solid line substantially match each other, which implies that the spectral transmittance of the optical element 105 is shaped in substantially the same manner as the spectral intensity of light from an animal skin, as desired. There is to a certain degree mismatch in the wavelength range of 400 nm or shorter and the wavelength range of 750 nm or longer. However, since human eyes only have low sensitivity to light in these wavelength ranges, the light emitted from the optical element 105 appears, for the human eyes, to have the color of an animal skin. In order to improve the accuracy in the short wavelength range, the available wavelength range may be shifted towards the shorter wavelength side by changing the retardations of the phasers 121 or phase modulators 122. In a similar manner, the accuracy in the long wavelength range can be also improved.

As discussed above, the optical device 100 can effectively convert the unpolarized white light from the light source 190 into light having substantially the same spectrum as light from an animal skin by setting the retardation of the phase modulators 122 at various values and adjusting the temporal durations during which these respective retardation values are maintained at the phase modulators 122. In addition, the optical device 100 adjusts the values of $\Delta_1$ and $\Delta_{liq}$ and the above-mentioned temporal durations according to the spectral intensity and polarization of the light received from the light source 190, thereby effectively reproducing light having a predetermined spectrum.

FIGS. 4A and 4B illustrate an example of the optical device 100 having a plurality of optical elements 105. As seen from FIG. 4A, the present optical device 100 is different from the optical device 100 shown in FIG. 1 in that a plurality of optical elements 105a to 105z (hereinafter collectively referred to as the optical elements 105) are provided.

FIG. 4B illustrates how the optical elements 105 are arranged in the plane perpendicular to the propagation axis of the incident light. As seen from FIG. 4B, in the present optical device 100, the optical elements 105 are arranged in a matrix in the plane perpendicular to the propagation direction of the incident light. The phase differences generated in the incident light by the different sets of phase modulators 122 in differently positioned optical elements 105 are respectively adjusted such that the differently positioned optical elements 105 emit light rays having different spectra.

Specifically speaking, the phase difference generated in the incident light by a set of phase modulators 122 in each optical element 105 is adjusted such that a plurality of optical elements 105 positioned in the vicinity of each other respectively emit light rays having partial spectra forming a predetermined spectrum. For example, when the optical elements 105 are arranged at a pitch shorter than the spatial resolution that can be sensed by a human or measuring apparatus, light having a predetermined spectrum can be effectively observed by causing the optical elements 105 positioned in the vicinity of each other to emit light rays having partial spectra that together form the predetermined spectrum.

Here, as described with reference to FIGS. 2 and 3, the spectral transmittance of each optical element 105 may be adjusted so as to emit light having a partial spectrum, by temporally varying the retardation of the phase modulators 122. In this manner, the optical elements 105 according to the present configuration can effectively reproduce light rays respectively having different spectra at different positions.

As described with reference to FIGS. 1 to 4B, the spectral transmittance of the optical element 105 can be effectively freely adjusted. Therefore, the optical element 105 can be used as a color filter for an image capturing system, or a color filter for a display device. For example, the optical element 105 can be used for a medical system that needs to produce an accurately color-reproduced image regardless of the light source, or as a color filter for use with a shopping catalog.

Figure 5:
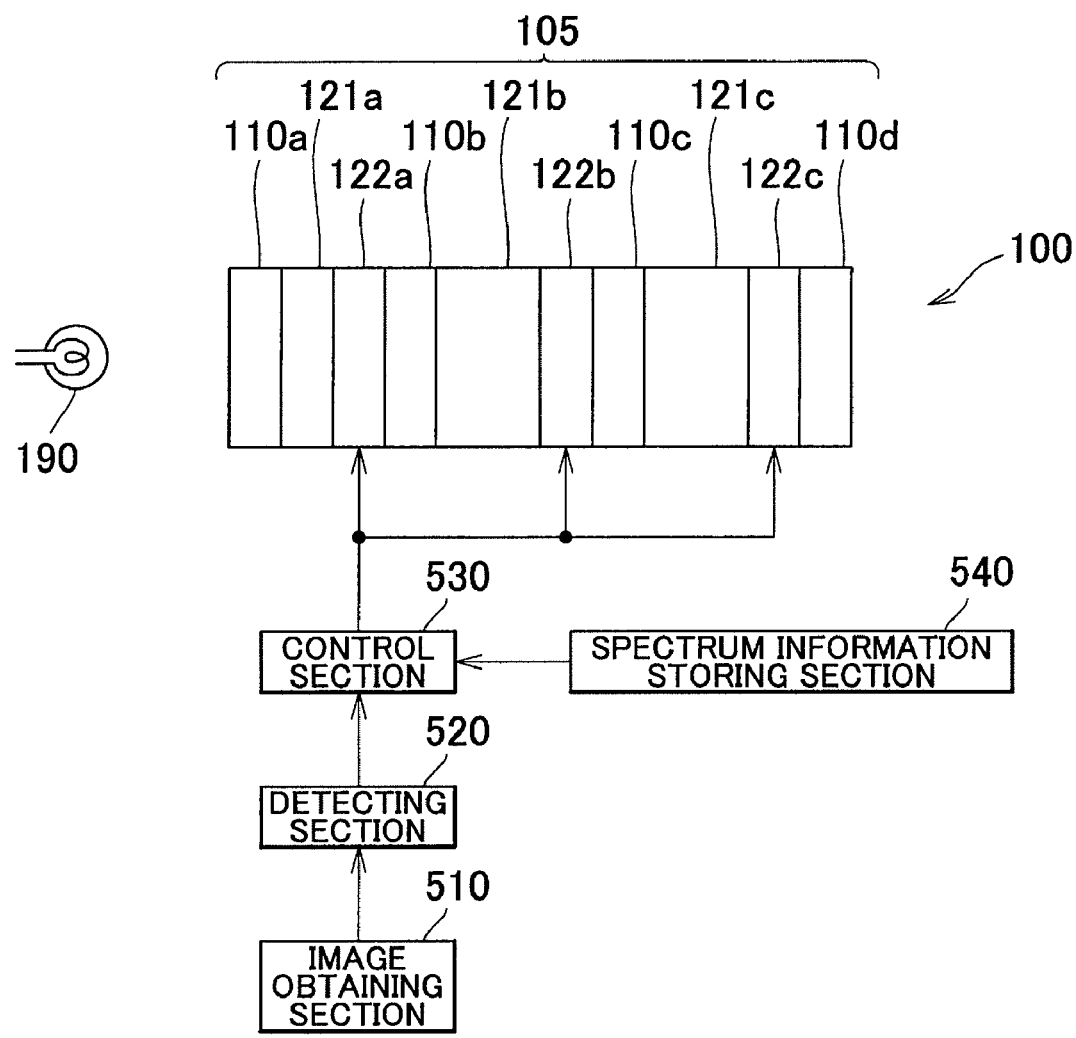
FIG. 5 illustrates an exemplary configuration of an optical system 500.

FIG. 5 illustrates an exemplary configuration of an optical system 500. The optical system 500 includes the optical device 100 described with reference to FIGS. 1 to 3, an image obtaining section 510, a detecting section 520, a spectrum information storing section 540, and a control section 530.

The image obtaining section 510 obtains an image of a subject. The image can be obtained by image-capturing the subject, for example. The detecting section 520 detects an object showing the subject in the obtained image. For example, the detecting section 520 can detect the object by using a technique such as object matching.

The spectrum information storing section 540 stores, in association with an object, a spectrum of light from a subject shown by the object. For example, the spectrum information storing section 540 stores, in association with an object showing an animal skin, the spectrum of light from the animal skin. The control section 530 controls the spectral transmittance of the optical element 105 according to the spectrum stored on the spectrum information storing section 540 in association with the object detected by the detecting section 520. For example, the control section 530 controls the spectral transmittance of the optical device 100 so that the optical element 105 emits light having the spectrum stored on the spectrum information storing section 540 in association with the object detected by the detecting section 520.

The spectral transmittance of the optical element 105 can be controlled by temporally varying the parameter $\Delta_{liq}$, as described with reference to FIGS. 1 to 3. Therefore, the control section 530 temporally controls the parameter $\Delta_{liq}$ of each phase modulator 122 in such a manner that the optical element 105 effectively emits light having the spectrum stored on the spectrum information storing section 540. Here, the retardations of the phase modulators 122 can be controlled by means of electric fields when the phase modulators 122 are made of OCB liquid crystal or the like. In this case, the control section 530 may control the retardations of the phase modulators 122 by means of electric fields, according to the spectrum stored on the spectrum information storing section 540 in association with the object detected by the detecting section 520.

As described above, the control section 530 temporally adjusts the phase differences generated in the incident light by the phase modulators 122 such that the optical device transmits light rays in different wavelength ranges at different timings, according to the spectrum stored on the spectrum information storing section 540 in association with the object detected by the detecting section 520. As a modification example of the optical system 500, a plurality of optical elements 105 may be arranged in a matrix as described with reference to FIGS. 4A and 4B. In this case, the control section 530 may adjust the phase difference generated in the incident light by a set of phase modulators 122 in each optical element 105 such that optical elements 105 positioned in the vicinity of each other respectively emit light rays having partial spectra forming a spectrum substantially the same as the spectrum stored on the spectrum information storing section 540 in association with the object detected by the detecting section 520.

Although some aspects of the present invention have been described by way of exemplary embodiments, it should be understood that those skilled in the art might make many changes and substitutions without departing from the spirit and the scope of the present invention which is defined only by the appended claims.

The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

What is claimed is:

1. An optical device comprising:
a plurality of polarizers that are arranged along a propagation direction of incident light, the plurality of polarizers having transmission axes of substantially the same direction;
a phaser that is provided between the plurality of polarizers, the phaser having a retarded-phase axis forming a predetermined angle with the transmission axes of the plurality of polarizers; and
a phase modulator that is provided adjacent to the phaser along the propagation direction, the phase modulator having a retarded-phase axis of substantially the same direction as the retarded-phase axis of the phaser, wherein
a phase difference generated in the incident light by the phase modulator is temporally adjusted such that the optical device transmits light in different wavelength ranges at different timings,
wherein
the number of the plurality of polarizers arranged along the propagation direction of the incident light is equal to or greater than three,
one or more phasers are additionally provided, and each of the phasers is provided between any two of the three or more polarizers, and
one or more phase modulators are additionally provided, and each of the phase modulators is provided adjacent to one of the phasers along the propagation direction, and
wherein
the phasers generate phase differences in the incident light that increase substantially arithmetically or geometrically in an arrangement order of the phasers along the propagation direction.

2. The optical device as set forth in claim 1, wherein
the retarded-phase axis of the phaser forms an angle of substantially 45 degrees with the transmission axes of the plurality of polarizers.

3. The optical device as set forth in claim 1, wherein
phase differences generated in the incident light by the phase modulators are temporally adjusted such that the optical device emits, at different timings, light rays respectively having a plurality of partial spectra that together form a predetermined spectrum.

4. The optical device as set forth in claim 1, wherein
the plurality of polarizers, the phasers and the phase modulators constitute an optical element, and
the optical device comprises
a plurality of the optical elements that are arranged in a matrix.

5. The optical device as set forth in claim 4, wherein
phase differences generated in the incident light by different sets of the phase modulators in differently positioned optical elements are respectively adjusted such that the differently positioned optical elements emit light rays having different spectra from each other.

6. An optical system comprising:
an optical device;
an image obtaining section that obtains an image of a subject;
a detecting section that detects an object showing the subject in the obtained image;
a spectrum information storing section that stores therein, in association with the object, a spectrum of light from the subject shown by the object; and
a control section that controls a spectral transmittance of the optical device according to the spectrum stored in the spectrum information storing section in association with the object detected by the detecting section, wherein
the optical device includes:
a plurality of polarizers that are arranged along a propagation direction of incident light, the plurality of polarizers having transmission axes of substantially the same direction;
a phaser that is provided between the plurality of polarizers, the phaser having a retarded-phase axis forming a predetermined angle with the transmission axes of the plurality of polarizers; and
a phase modulator that is provided adjacent to the phaser along the propagation direction, the phase modulator having a retarded-phase axis of substantially the same direction as the retarded-phase axis of the phaser, and
the control section temporally adjusts a phase difference generated in the incident light by the phase modulator such that the optical device transmits light in different wavelength ranges at different timings, according to the spectrum stored in the spectrum information storing section in association with the object detected by the detecting section,
wherein
the number of the plurality of polarizers arranged along the propagation direction of the incident light is equal to or greater than three,
one or more phasers are additionally provided, and each of the phasers is provided between any two of the three or more polarizers, and
one or more phase modulators are additionally provided, and each of the phase modulators is provided adjacent to one of the phasers along the propagation direction, and
wherein
the phasers generate phase differences in the incident light that increase substantially arithmetically or geometrically in an arrangement order of the phasers along the propagation direction.

7. An optical device comprising:
a plurality of optical elements arranged on a plane,
each of the plurality of optical elements comprising:
a plurality of polarizers that are arranged along a propagation direction of incident light, the plurality of polarizers having transmission axes of substantially the same direction;
a phaser that is provided between the plurality of polarizers, the phaser having a retarded-phase axis forming a predetermined angle with the transmission axes of the plurality of polarizers; and
a phase modulator that is provided adjacent to the phaser along the propagation direction, the phase modulator having a retarded-phase axis of substantially the same direction as the retarded-phase axis of the phaser, wherein phase differences generated in the incident light respectively by the phase modulators in the plurality of optical elements are adjusted such that optical elements positioned in the vicinity of each other emit light rays having partial spectra that together form a predetermined spectrum,
wherein
in each of the plurality of optical elements,
the number of the plurality of polarizers arranged along the propagation direction of the incident light is equal to or greater than three,
one or more phasers are additionally provided, and each of the phasers is provided between any two of the three or more polarizers, and
one or more phase modulators are additionally provided, and each of the phase modulators is provided adjacent to one of the phasers along the propagation direction, and
wherein
in each of the plurality of optical elements, the phasers generate phase differences in the incident light that increase substantially arithmetically or geometrically in an arrangement order of the phasers along the propagation direction.

8. The optical device as set forth in claim 7, wherein
in each of the plurality of optical elements, the retarded-phase axis of the phaser forms an angle of substantially 45 degrees with the transmission axes of the plurality of polarizers.

9. An optical system comprising:
an optical device;
an image obtaining section that obtains an image of a subject;
a detecting section that detects an object showing the subject in the obtained image;
a spectrum information storing section that stores therein, in association with the object, a spectrum of light from the subject shown by the object; and
a control section that controls a spectral transmittance of the optical device according to the spectrum stored in the spectrum information storing section in association with the object detected by the detecting section, wherein
the optical device comprises:
a plurality of optical elements arranged on a plane,
each of the plurality of optical elements comprising:
a plurality of polarizers that are arranged along a propagation direction of incident light, the plurality of polarizers having transmission axes of substantially the same direction;
a phaser that is provided between the plurality of polarizers, the phaser having a retarded-phase axis forming a predetermined angle with the transmission axes of the plurality of polarizers; and
a phase modulator that is provided adjacent to the phaser along the propagation direction, the phase modulator having a retarded-phase axis of substantially the same direction as the retarded-phase axis of the phaser, and the control section adjusts phase differences generated in the incident light by phase modulators in optical elements positioned in the vicinity of each other such that the optical elements positioned in the vicinity of each other respectively emit light rays having partial spectra that together form a spectrum substantially the same as the spectrum stored on the spectrum information storing section in association with the object detected by the detecting section,
wherein
in each of the plurality of optical elements, the number of the plurality of polarizers arranged along the propagation direction of the incident light is equal to or greater than three, one or more phasers are additionally provided, and each of the phasers is provided between any two of the three or more polarizers, and one or more phase modulators are additionally provided, and each of the phase modulators is provided adjacent to one of the phasers along the propagation direction, and wherein in each of the plurality of optical elements, the phasers generate phase differences in the incident light that increase substantially arithmetically or geometrically in an arrangement order of the phasers along the propagation direction.

\* \* \* \* \*